(12) United States Patent
Ikeda et al.

(10) Patent No.: US 7,077,704 B2
(45) Date of Patent: Jul. 18, 2006

(54) BATTERY CONNECTING PLATE, AND ATTACHMENT STRUCTURE OF THE SAME

(75) Inventors: Tomohiro Ikeda, Haibara-gun (JP); Kazuaki Saito, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 246 days.

(21) Appl. No.: 10/652,207

(22) Filed: Sep. 2, 2003

(65) Prior Publication Data

US 2004/0043663 A1    Mar. 4, 2004

(30) Foreign Application Priority Data

Aug. 30, 2002  (JP)  ............................ P2002-255603

(51) Int. Cl.
 *H01R 24/00*   (2006.01)
 *H01R 33/00*   (2006.01)
(52) U.S. Cl. ....................... 439/627; 439/500; 439/251
(58) Field of Classification Search ................ 439/627, 439/500, 207, 208, 210–213, 382, 76.1, 620–622, 439/248, 246, 250, 251; 174/65 R, 50, 59, 174/68.2, 70 B, 71 B, 72 B, 99 B, 88 B, 174/149 B See application file for complete search history.

(56) References Cited

U.S. PATENT DOCUMENTS

| | | | | |
|---|---|---|---|---|
| 5,295,847 | A | * | 3/1994 | Ozaki et al. ................. 439/212 |
| 6,206,718 | B1 | * | 3/2001 | Takahashi et al. ........... 439/382 |
| 6,322,376 | B1 | * | 11/2001 | Jetton ......................... 439/76.2 |
| 6,346,011 | B1 | * | 2/2002 | Ikeda .......................... 439/627 |

FOREIGN PATENT DOCUMENTS

JP          2000-333343 A     11/2000

* cited by examiner

*Primary Examiner*—Tho D. Ta
*Assistant Examiner*—Felix O. Figueroa
(74) *Attorney, Agent, or Firm*—Sughrue Mion, PLLC (57) ABSTRACT

A plate body is disposed on a plurality of arrayed batteries. A first terminal is provided with a first portion which is connected to one of the batteries, and a second portion which is connected to an electronic element. A cover member is attached onto the plate body in a first direction, to provisionally fix the first terminal on the plate body. The first terminal is provided with a tolerance compensator, which connects the first portion and the second portion while compensating a positional difference between the first portion and the second portion in the first direction.

11 Claims, 7 Drawing Sheets

BATTERY CONNECTING PLATE, AND ATTACHMENT STRUCTURE OF THE SAME

BACKGROUND OF THE INVENTION

The present invention relates to a battery connecting plate for connecting batteries mounted in an electric vehicle, and relates to an attachment structure of the same.

Figure 7:
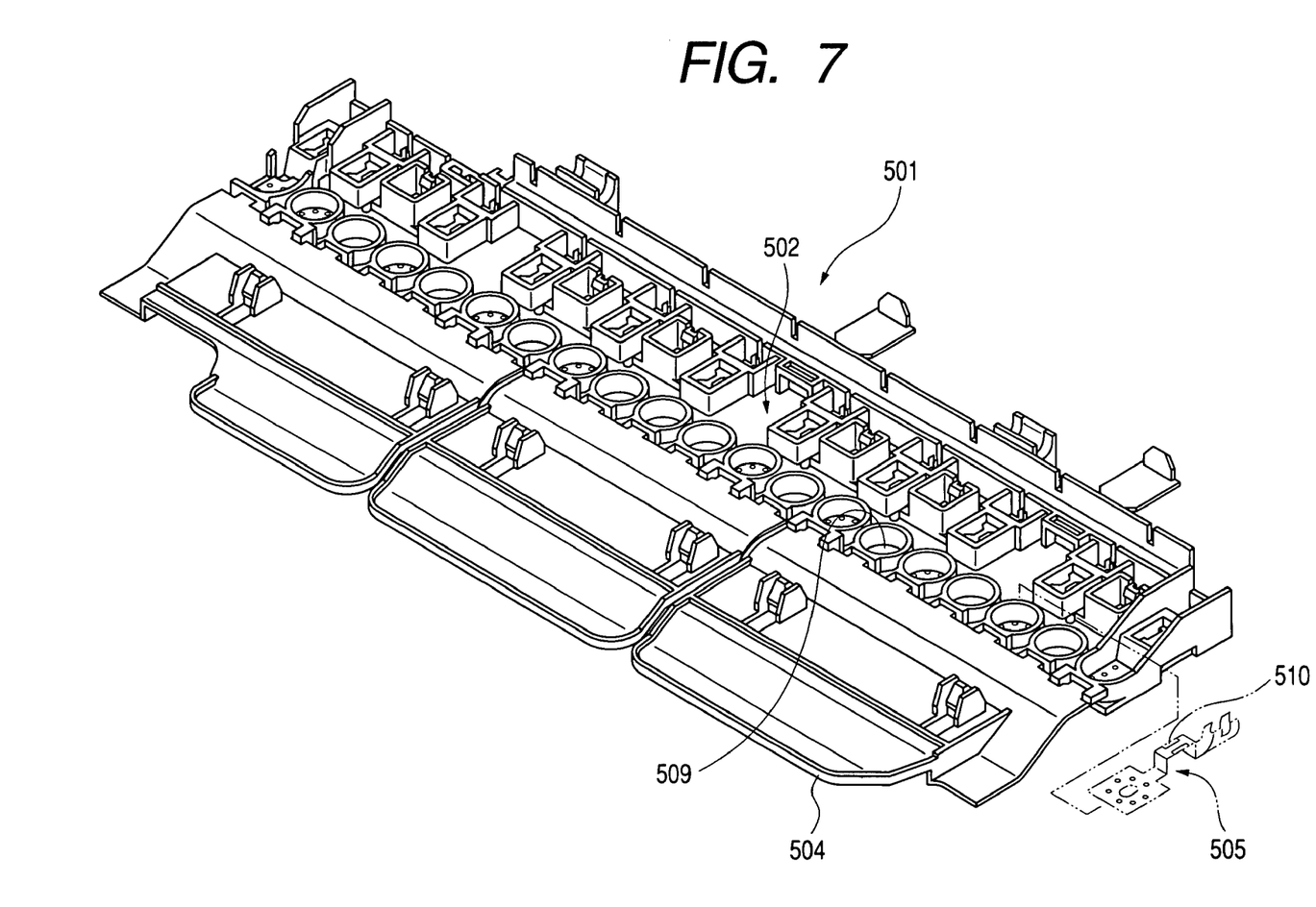
FIG. 7 is a perspective view of a related-art battery connecting plate.

FIG. 7 shows a related-art battery connecting plate disclosed in Japanese Patent Publication No. 2000-333343A.

In a battery connecting plate 501, a terminal 505 and a bus bar 509 are insertion-molded with a plate body 502. The terminal 505 is screwed to the electrode of a battery. Also attached to the plate body 502 are pivotable covers 504.

In such a structure, it is difficult to compensate the size tolerances for batteries when the connection work is performed. If the terminal 505 is used to compensate such size tolerance, a crack may occur in the terminal 505. Furthermore, since an electronic element is soldered to an element mounting portion 510 of the terminal 505, either the soldered portion may be peeled off or a crack may occur in the soldered portion.

SUMMARY OF THE INVENTION

It is therefore an object of the invention to provide an improved battery connecting plate and an attachment structure thereof that can compensate the size tolerance for batteries while avoiding the above problems such as the peeling of the solder on a terminal or cracks in the terminal.

In order to achieve the above object, according to the invention, there is provided a battery connecting plate, comprising;

a plate body, disposed on a plurality of arrayed batteries;

a first terminal, provided with a first portion which is connected to one of the batteries, and a second portion which is connected to an electronic element; and a cover member, attached onto the plate body in a first direction, to provisionally fix the first terminal on the plate body, wherein the first terminal is provided with a tolerance compensator, which connects the first portion and the second portion while compensating a positional difference between the first portion and the second portion in the first direction.

With this configuration, the positional difference between the battery and the electronic element are positively compensated by the tolerance compensator of the first terminals. Therefore, the battery connecting plate that is provided ensures that cracks in the first terminal will not occur.

Here, the battery connecting plate further comprises a fixation member, which fixes the first portion of the first terminal to the one of the batteries to thereby plenarily fixing the first terminal on the plate body.

Preferably, the first terminal comprises a terminal body and a flexible leg portion extended from the terminal body to serve as the tolerance compensator.

In this case, the positional difference between the battery and the electronic element can be accurately compensated by flexing the flexible leg portion of the first terminal.

Here, it is preferable that the terminal body is provided with the first portion, and the flexible leg portion is provided with the second portion.

In this case, cracks do not occur in the terminal body portion, and the electric connection of the battery to the electronic element via the first terminals is ensured for a long time period.

Preferably, the battery connecting plate further comprises a second terminal, to which the first terminal is electrically connected via the electronic element.

With this arrangement, when there is a change in a current flowing from the battery, the state of the battery can be detected by the electronic element positioned between the first terminal and the second terminal.

Here, it is preferable that the first terminal, the second terminal and the electronic element are electrically connected by soldering.

In this case, since the positional difference between the battery and the electronic element are appropriately compensated by the tolerance compensator of the first terminal, the solder connecting the first terminal and the electronic element is protected and is not peeled off.

Preferably, the cover member comprises: a first cover, which is disposed on the plate body to provide a predetermined position relative to the plate body at which the second portion of the first terminal is placed; and a second cover, which is attached onto the first cover in the first direction to provisionally fix the flexible leg portion between the first cover and the second cover.

With this configuration, the first terminal protected by the first cover and the second cover.

Preferably, the plate body is formed with a first stopper, which restricts a movement of the cover member in the first direction.

Preferably, the plate body is formed with a second stopper, which restricts a movement of the cover member in a second direction opposite to the first direction.

With the above configurations, it is prevented the cover member from dropping through the plate body.

Preferably, the electronic element is an overcurrent protection resister provided in accordance with a maximum output voltage of the one of the batteries.

With this arrangement, when a battery is charged, or a current is supplied by the battery, an abnormality, such as a battery overcurrent, can be detected by the overcurrent protection resistor.

Preferably, the battery connecting plate further comprises a conductive bus bar, which comprises: a first portion, connected to a first one of the batteries; a second portion, connected to a second one of the batteries; and a fulcrum portion, situated between the first portion and the second portion.

Here, the plate body is formed with a protrusion which supports the fulcrum portion such that the bus bar is allowed to move in a see-saws manner before the bus bar is fixed on the plate body.

Here, it is preferable that the fulcrum portion of the bus bar and the protrusion of the plate body are configured such that the first portion of the bus bar is separated from the plate body when the second portion of the bus bar is brought into contact with the plate body.

With this arrangement, when the batteries are electrically connected by the bus bar, the size tolerance of the batteries is positively compensat d by the bus bar. Therefore, each of the batteries is easily and accurately mounted on the plate body, and the batteries are appropriately connected by the bus bar.

With the above configurations, assembly of the batteries can be easily and rapidly performed, so that the efficiency of the battery assembling process can be improved.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

Preferred embodiments of the invention will be described below in detail with reference to the accompanying drawings.

Figure 1:
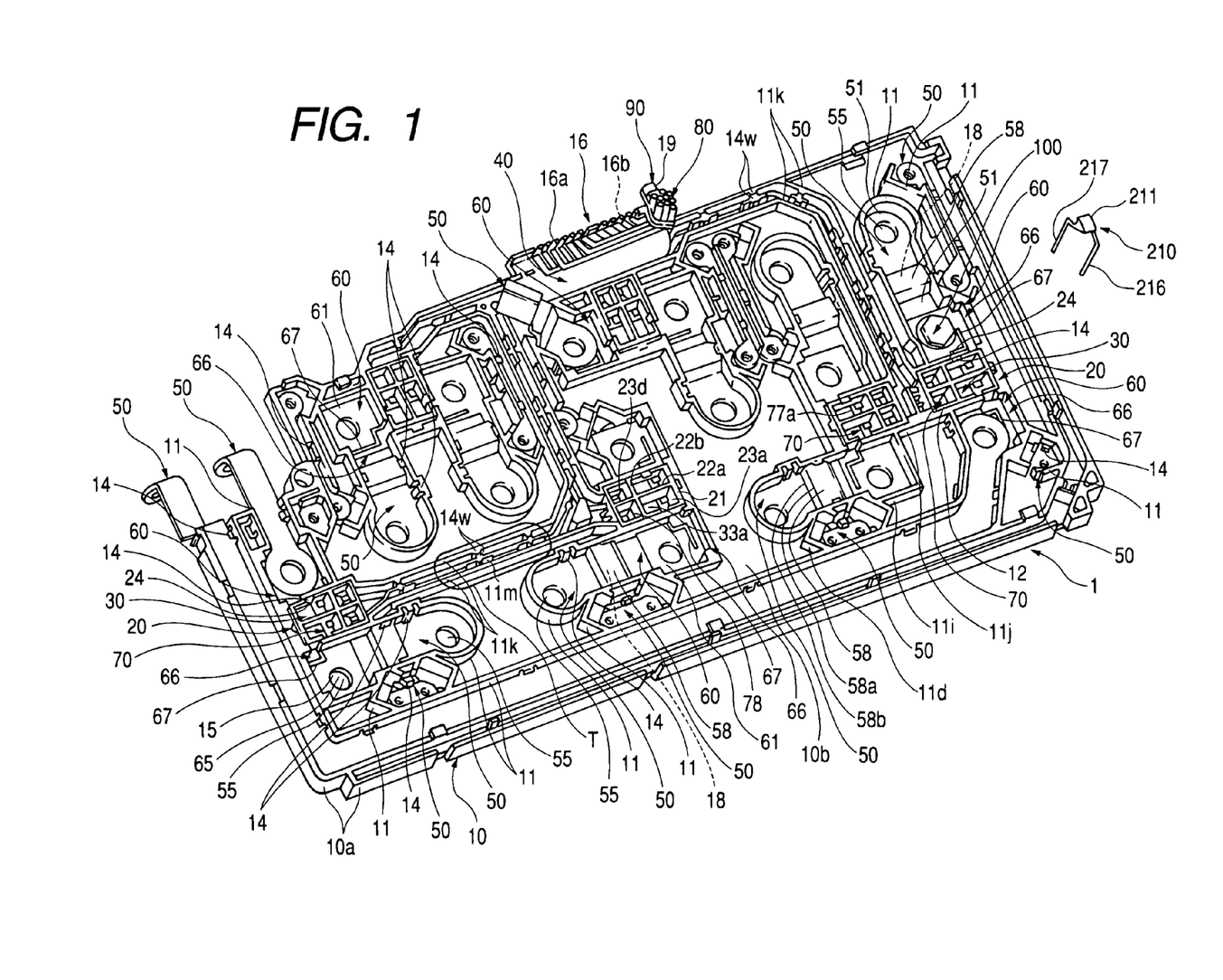
FIG. 1 is a perspective view of a battery connecting plate according to a first embodiment of the invention.
Figure 2:
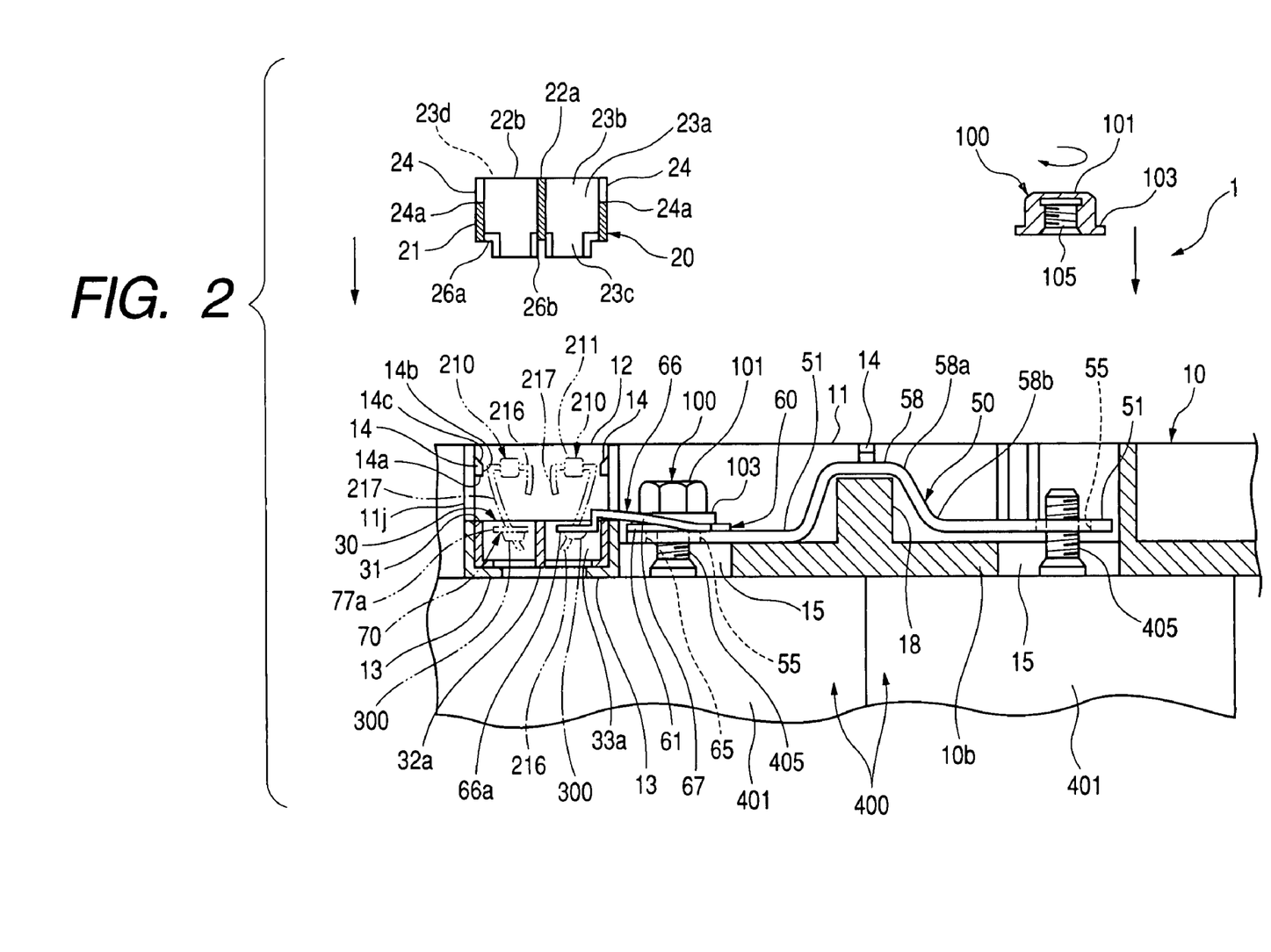
FIG. 2 is a vertical cross-sectional view of the battery connecting plate.

While referring to FIGS. 1 and 2, the side on which a nut 100 is located, on a plate body 10 that constitutes a battery connecting plate 1, is defined as an upper side, and the side of a base wall 10b that forms the plate body 10 is defined as a lower side. It should be noted, however, that in this specification the upper and lower sides are defined merely for the convenience of the explanation, and do not always match the side positioning when the battery connecting plate is actually employed.

In these figures, the battery connecting plate 1 according to a first embodiment roughly comprises the plate body 10 which is mounted on batteries 400 that are arranged both vertically and horizontally; terminals 60 which are mounted on the plate body 10 and electrically connect batteries 400 and electronic elements 210; and upper covers 20 and lower covers 30 which are used to attach the terminals 60 to the plate body 10.

The vertical size tolerance of the thus arranged batteries 400 is defined as being about ±0.1 mm. In order to assemble these batteries 400 into a single unit, the plate body 10 is attached to these batteries 400.

The plate body 10 includes the base wall 10b; a upright peripheral wall 10a formed around the outer edge of the base wall 10b; and upright guide walls 11, 11i, 11j, 11k and 11m formed on the base wall 10b. These members are integrally formed by using a synthetic resin material.

Metallic bus bars 50, which are plated with tin in order to provide improved anticorrosion, are held in respective storage portions along the guide walls 11. The terminals 60 are guided along the guide walls 11i and are held in the storage portions wherein the bus bars 50 are located. The upper and lower covers 20 and 30 made of synthetic resin are guided along the guide walls 11j to the respective storage portions.

Figure 5:
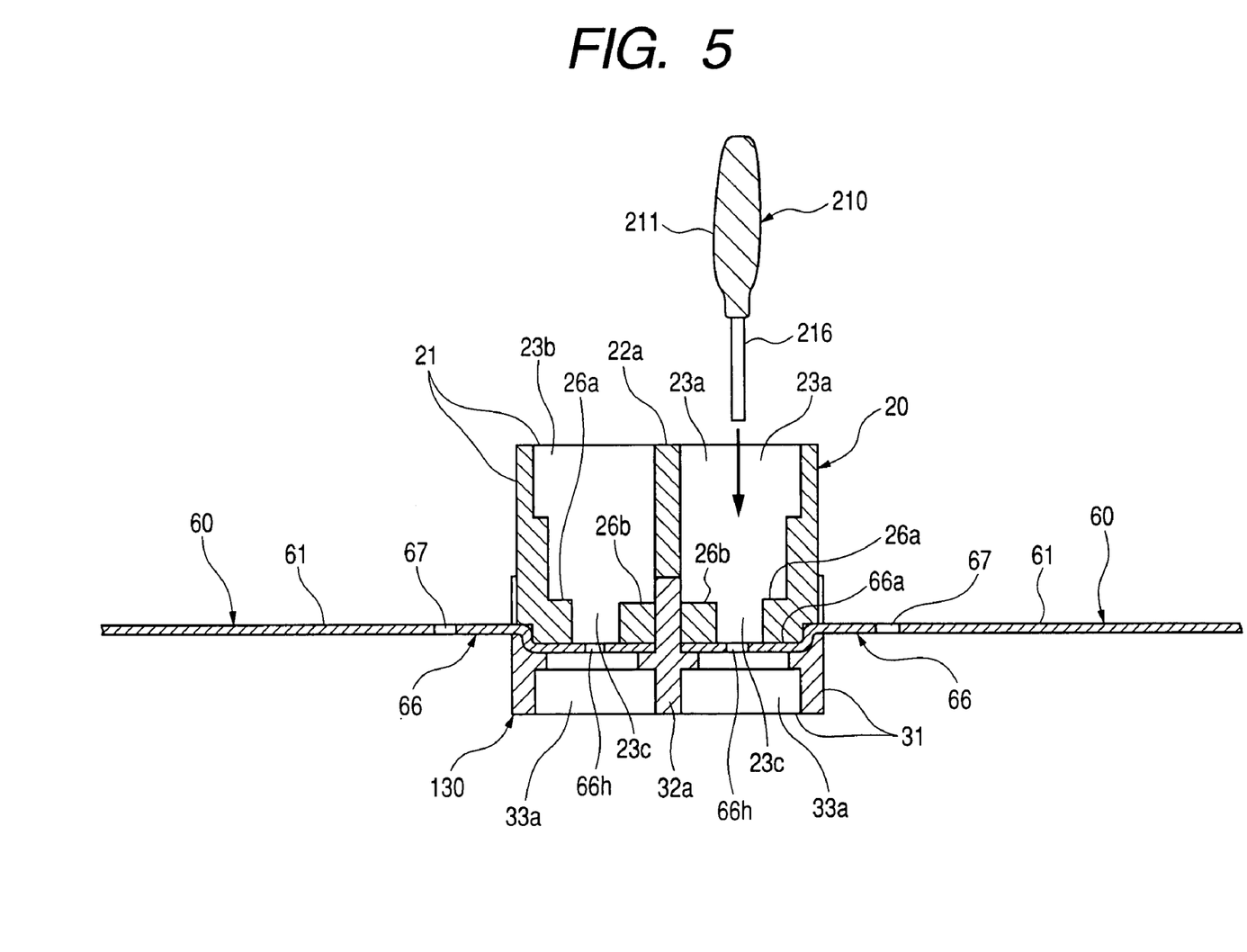
FIG. 5 is an enlarged vertical cross-sectional view of a portion where an electronic element is mounted on the battery connecting plate.

Each of the upper covers 20 is formed with a peripheral wall 21 having a substantially rectangular box shape, and a plurality of partition walls 22a and 22b, which intersect with the peripheral wall 21 to define hollow storage portions 23a (see FIG. 5). Further, each of the upper covers 20 is formed with through holes 23c communicated with the storage portions 23a.

Each of the lower covers 30 includes: a peripheral wall 31 having a substantially rectangular box shape; partition walls 32a formed inside the peripheral wall 31 to define rectangular storage portions 33a.

Voltage detectors can be employed as the electronic elements 210 and 220. And specifically, overcurrent prevention resistors are employed as the electronic elements 210 and 22.

The bus bars 50, which electrically connect the batteries 400 in series via the terminals 60, are mounted on the plate body 10. For each of the bus bars 50, a convex portion 58 is placed almost in the center thereof, and a pair of contact portions 51 are provided.

To form bent portions 58a and 58b of the convex portions 58 (see FIG. 2), press machining, such as punching or bending, is performed with respect to a metal strip. With this structure, the rigidity of the curved convex portions 58 is increas d. Furthermore, a support portion 18 is projected from the plate body 10 so as to support the convex portion 58 of the bus bar 50.

When the bus bar 50 is attached to the plate body 10, and when the convex portion 58 of the bus bar 50 is aligned with the support portion 18 of the plate body 10, one of the contact portions 51 of the bus bar 50 is brought into contact with the base wall 10b of the plate body 1, while the other contact portion 51 of the bus bar 50 is separated from the base wall 10b. That is, a little play is provided for the bus bars 50 when it is mounted on the plate body 10.

With this arrangement, when the plate body 10 is employed and the batteries 400 are electrically interconnected via the bus bars 50, the vertical size tolerance for the batteries 400 is positively compensated by the bus bars 50 provided with the play. Therefore, the plate body 10 can be easily and accurately mounted on the batteries 400, while the electrical connection of the batteries is ensured by the bus bars 50.

In the state before the bus bars 50 are fixed to the plate body 10 using tools, such as nuts 100, at the convex portions 58 the bus bars 50 placed on the plate body 10 can move in a see-saws manner. With this arrangement, the vertical size tolerance of the batteries 400 and the attachment difference between the batteries 400 and the plate body 10 can be compensated. Further, pairs of holes 55 slight largely formed in the bus bars 50 also serve to compensate the size tolerance and the attachment difference for the batteries 400.

As shown in FIG. 2, each of the nuts 100 includes a body 101 consisting of an integrally formed hexagonal prism and a flathead washer 103. Internal threads 105 are formed for the body 101, and electrodes 405 that serve as external threads are extended from main bodies 401 of the batteries 400. Relative to the electrodes 405, through holes 15, 55 and 65 are respectively formed in the base wall 10b of the plate body 10, the contact portions 51 of the bus bar 50 and contact portions 61 of the terminals 60 (described later).

When the through holes 15, 55 and 65 are aligned and the electrodes 405 of the batteries 400 are inserted into these through holes, and when the nuts 100 having the internal threads 105 engage the electrodes 405 that serve also as the external threads, the plate body 10 is fixed to the batteries 400, and the terminals 60 and the bus bar 50 are secured to the plate body 10.

When the internal threads 105 of the nuts 100 completely engage the external threads 405 of the batteries 400, the flathead washers 103 provided for the nuts 100 abut upon the terminal main bodies 61 on one side, while the flathead washers 103 on the other side abut upon the contact portions 51 of the bus bars 50. Further, at this time, the convex portions 58 formed by bending the bus bars 50 are flexed slightly, and the paired contact portions 51 provided for the bus bars 50a are brought in contact with the base wall 10b of the plate body 10.

As shown in FIGS. 1 and 2, the bus bars 50 are secured to the plate body 10 by retainers 14 which are provided on the guide walls 11. While the power lines 80 are secured to the plate body 10 by the peripheral wall 10a and retainers 14w which are provided on the guide walls 11k and 11m.

As shown in FIG. 2, each of the retainers 14 are is formed with a retaining face 14a, a connecting face 14b and a contact slope 14c. In association with the retainers 14, engagement recesses 24 having contact faces 24a are provided on the peripheral walls 21 of the upper covers 20. When the protruded retainers 14 are fitted with the engagement recesses 24, the upper covers 20 are attached to the plate body 10, as shown in FIG. 1.

Incidentally, since the retaining faces 14a of the retainers 14 is brought into contact with the contact faces 24a of the engagement recesses 24, the upper covers 20 are securely held to the plate body 10. Here, the terminals 60, which are located between the plate body 10 and the upper covers 20, are maintained in a temporarily assembled state with respect to the plate body 10.

Figure 3:
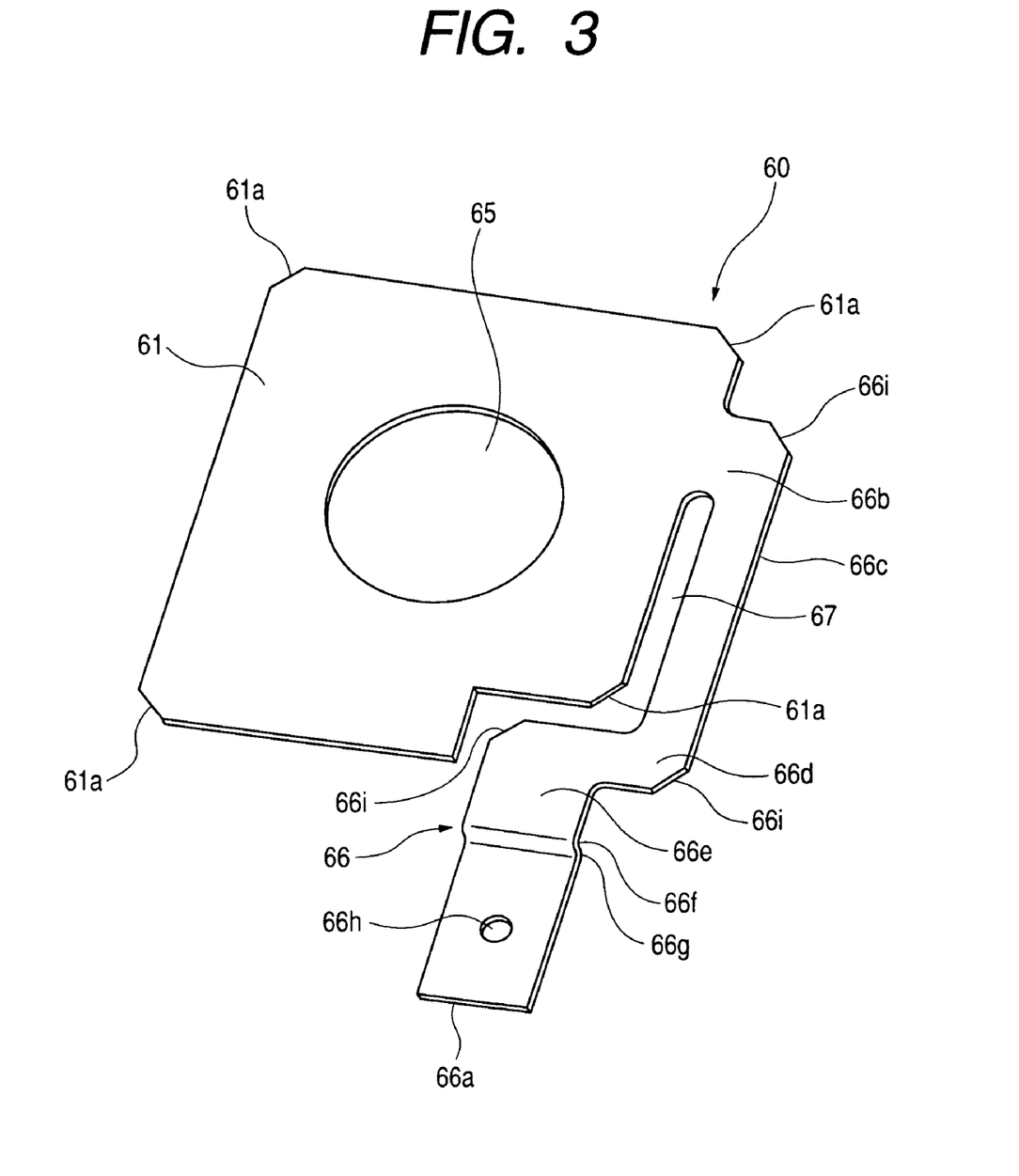
FIG. 3 is a perspective view of a terminal mounted on the battery connecting plate.

As shown in FIG. 3, each terminal 60, includes: a roughly rectangular terminal body 67 formed with an elongated crank-shaped notch 67; and a elongated crank-shaped flexible leg 66 which extends outward from the terminal body 61. As shown in FIG. 2, the vertical positional difference between the battery 400 and the electronic element 210 can be positively compensated by flexing the elongated flexible leg 66 of the terminal 60.

The flexible leg 66 is extended, beginning with a root portion 66b, through a straight portion 66c, curved portions 66d and 66e and folded portions 66f and 66g to a distal end portion 66a. A hole 66h having a small diameter is formed in the end portion 66a, so that a lead terminal 216 of the electronic element 210 can be passed therethrough, while a large diameter through hole 65 is formed in the terminal body 61, so that the electrode 405 of the battery 400 can be passed therethrough as described the above.

When the thus arranged terminals 60 are employed, the positional differences between the batteries 400 and the electronic elements 210 are positively compensated by the flexible legs 66 of the terminals 60. Therefore, it is possible to prevent cracks in the terminals 60 from occurring.

A plurality of linearly chamfered portions 61a and 66i are respectively formed on the terminal body 61 and the flexible leg 66. Chamfered portions may be formed roundly. The chaffered portions 61a and 66i are provided for the terminal 60 to prevent the concentration of stress on the terminal 60, and also to prevent the occurrence of a problem wherein a worker handles the terminals 60 carelessly and is injured. The terminal 60 is formed by presswork, such as punching or bending, employed for a material metal plate.

Further, terminals 70 are located between the upper and lower covers 20 and 30, and are connected to power lines 80. Each power line 80 is wired on the plate body 10 while being guided along the peripheral wall 10a, the continuous guide walls 11k and discrete guide walls 11m disposed between the guide walls 11k.

As shown in FIG. 2, solder 300 is used to connect the lead terminal 216, projecting out of a body 211 of each electronic element 210, with the flexible leg 66 of each terminal 60.

More specifically, to perform the soldering, the lead terminals 216 are inserted through the small holes 66h which are formed in the distal ends 66a of the flexible legs 66. On the other hand, the solder 300 is used also to connect the lead terminal 217 of the electronic element 210 to a distal end 77a of each terminal 70 (see also FIG. 4). More specifically, to perform soldering, the lead terminals 227 are inserted through the small holes 77h that are formed in the distal ends 77a of the terminals 70. With this arrangement, electrical connections are provided for the terminals 60 and 70.

Since the vertical positional difference between the batteries 400 and the electronic elements 210 is positively compensated by the flexible legs 66 of the terminals 60, it is prevented the solder 300 from peeling off the flexible legs 66 of the terminals 60.

In this embodiment, various soldering methods are employed. However, the soldering operation can be performed quickly and easily in a case where the electronic elements 210 has been mounted in the upper covers 20 and the lower covers 30.

According to these arrangements, when a current flowing from the batteries 400 is changed, the electronic elements 210 located between the terminals 60 and 70 can detect the status of the batteries 400.

The electronic elements 210 are, for example, overcurrent prevention resistors for detecting changes in a current at the border current value of about 70 mA.

A PTC (Positive Temperature Coefficient) thermistor can be employed as the electronic element 210. A characteristic of a PTC thermistor is that resistance in the is increased as the temperature rises, and according to this characteristic, the resistance is increased rapidly when the temperature of an element exceeds a specific value, so that a reduced current is output to reduce the temperature. To the contrary, since the resistance is sharply reduced as the temperature falls a little, the PTC thermistor is heated by supplying the current and the temperature is raised. Further, a PTC thermistor can cope specifically with the supply of electric power, and can be employed not only to detect temperatures but also to directly control the electric power supply. For the PTC thermistor, a self-controlling material is employed that can by itself suppress the heat generation temperature to a specific range.

An explanation will now be given for the use of a PTC thermistor to protect a battery or an electric device from an overcurrent. As the current flowing to a PTC thermistor is increased, Joule heat raises the temperature of the PTC thermistor. Therefore, through the function provided by the PTC thermistor, when the current flow exceeds a specific limit, in the PTC thermistor the resistance is increased to suppress or to out off the current. That is, when a PTC thermistor is used for overcurrent protection, it serves as a resistor having a fixed low resistance, but when an overcurrent is supplied to the PTC thermistor, the resistance is sharply increased to limit the current supply. Since the PTC thermistor employed for overcurrent protection acts as a fuse that can be easily recovered, it is handled as an overcurrent protection resistor.

Specifically, Posisters (trademark), by Murata Manufacturing Co., Ltd., that can cope with a predesignated voltage can be employed as the overcurrent prevention resistors 210 and 220. Thus, when a maximum voltage of about 6 V is set for the battery 400, an overcurrent prevention Posister of 6 V is employed as an overcurrent prevention resistor; when a maximum voltage of about 24 V is set for the battery 400, an overcurrent prevention Posister of 24 V is employed; and when a maximum voltage of about 125 V is set for the battery 400, an overcurrent prevention Posister of 125 V is employed. In addition, a normal current value and an abnormal current value are employed to determine which overcurrent prevention resistor to use for the battery 400.

As shown in FIG. 2, cover holder 12 is formed on the plate body 10. Th lower covers 30 are attached to a lower side of the cover holder 12. The terminals 70 and the flexible legs 66 and the terminals 60 are located on the lower covers 30. When the upper covers 20 are mounted from above the cover holders 12 in a condition that the terminals 70 and the distal ends 66a of the flexible legs 66 of the terminals 60 has been arranged, the terminals 60 and 70 are fixed to the plate body 10.

Since the terminals 60 and 70 are located between the upper covers 20 and the lower covers 30, these terminals 60 and 70 are protected by being enclosed by the upper and lower covers 20 and 30. In addition, by using pressing portions 26a and 26b, which are located at the lower portions of the upper covers 20, the distal ends 66a of the flexible legs 66 of the terminals 60 and the distal ends 77a of the terminals 70 are securely held by the upper covers 20 and the lower covers 30.

In this state, the soldering process performed for the lead terminal 216 of the electronic element 210 and the distal end 66a of the flexible leg 66 of the terminal 60, and the soldering process performed for the lead terminal 217 of the electronic element 210 and the distal end 77a of the terminal 70 can be easily performed. Therefore, the efficiency of manufacturing process for the battery connecting plate 1 is improved, ft should be noted that the solder 300 is a brazing alloy containing tin and that it has a low melting point.

Stoppers 13 (see FIG. 2) are projected at the four lower corners of each cover holder 12. When the lower four corners of the peripheral wall 31 of the lower cover 30 are brought into contact with the stoppers 13, the lower cover 30 is attached to the plate body 10 at a predetermined position.

Further, the stoppers 13 prevent the lower covers 30 from being dropped from the plate body and being lost. On the other hand, the retainers 14 located in the upper portion of the cover holders 12, the lower covers 30 are prevented from slipping out of the top of the cover holders 12.

Figure 4:
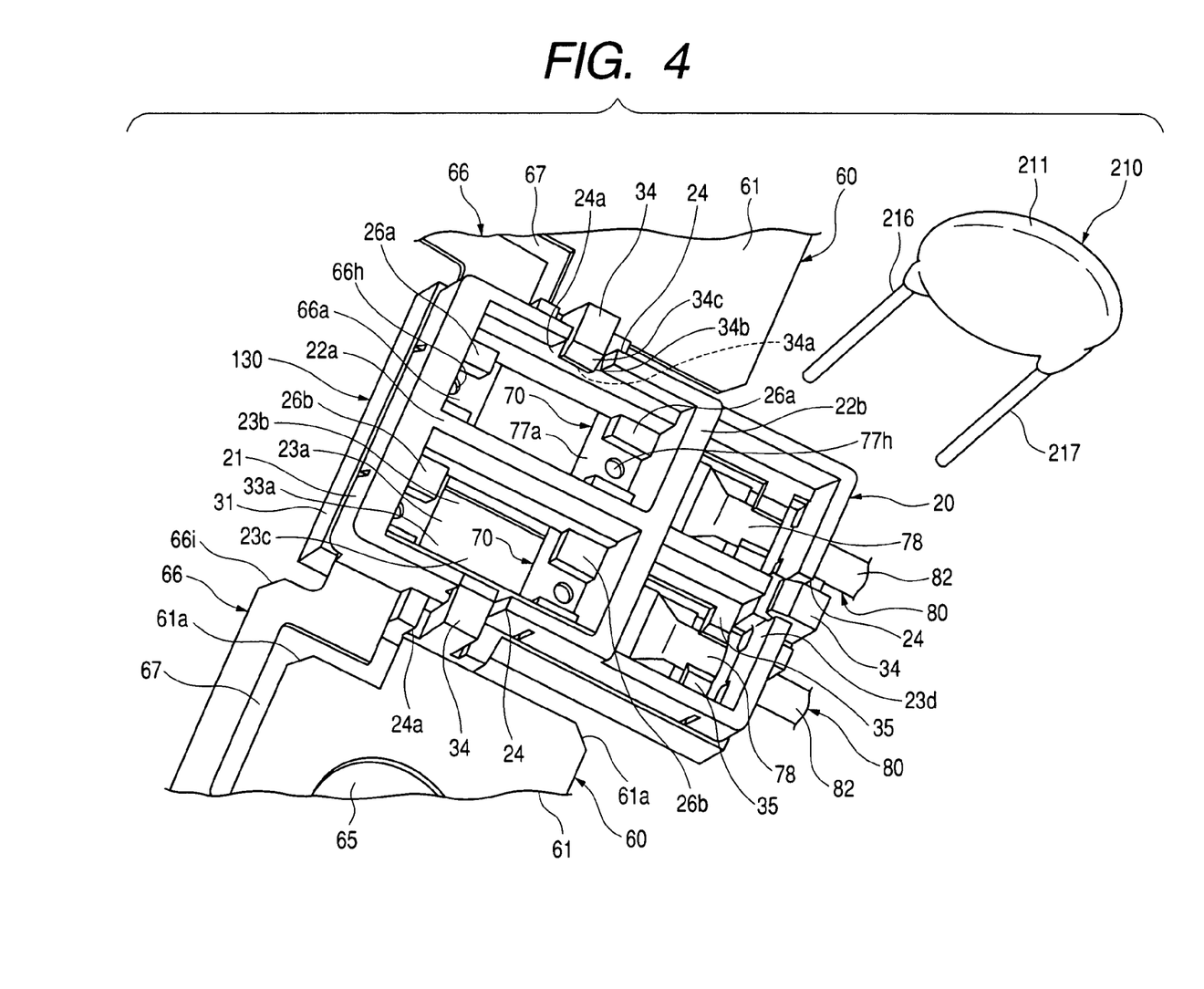
FIG. 4 is an exploded perspective view of a battery connecting plate according to a second embodiment of the invention.

As a second embodiment of the invention, the lower cover 30 may be replaced with a lower cover 130 shown in FIG. 4. The members substantially identical with those described in the first embodiment are designated by the same reference numerals.

In the lower cover 130, retainers 34 each formed with a retaining face 34a, a connecting face 34b and a contact slope 34c are provided in association with the engagement recesses 24 of the upper cover 20. The retainers 34 are fitted with the engagement recesses 24 to retain the upper cover 20 on the plate body 10, in place of the retainers 14 of the cover holder 12 in the first embodiment.

Here, the contact faces 24a of the engagement recesses 24 are brought into contact with the retaining faces 34a of the retainers 34, so that the upper covers 20 are securely held by the lower covers 130.

Alternatively, instead of the retainers 14 shown in FIG. 2, the retainers 34 having such a shape may be directly formed on the plate body 10.

Further, the lower covers 30 or 130 may be integrally formed with the plate body 10. More specifically, the same synthetic resin material may be employed to integrally form the plate body 10 and the lower covers 30 or 130.

Figure 6:
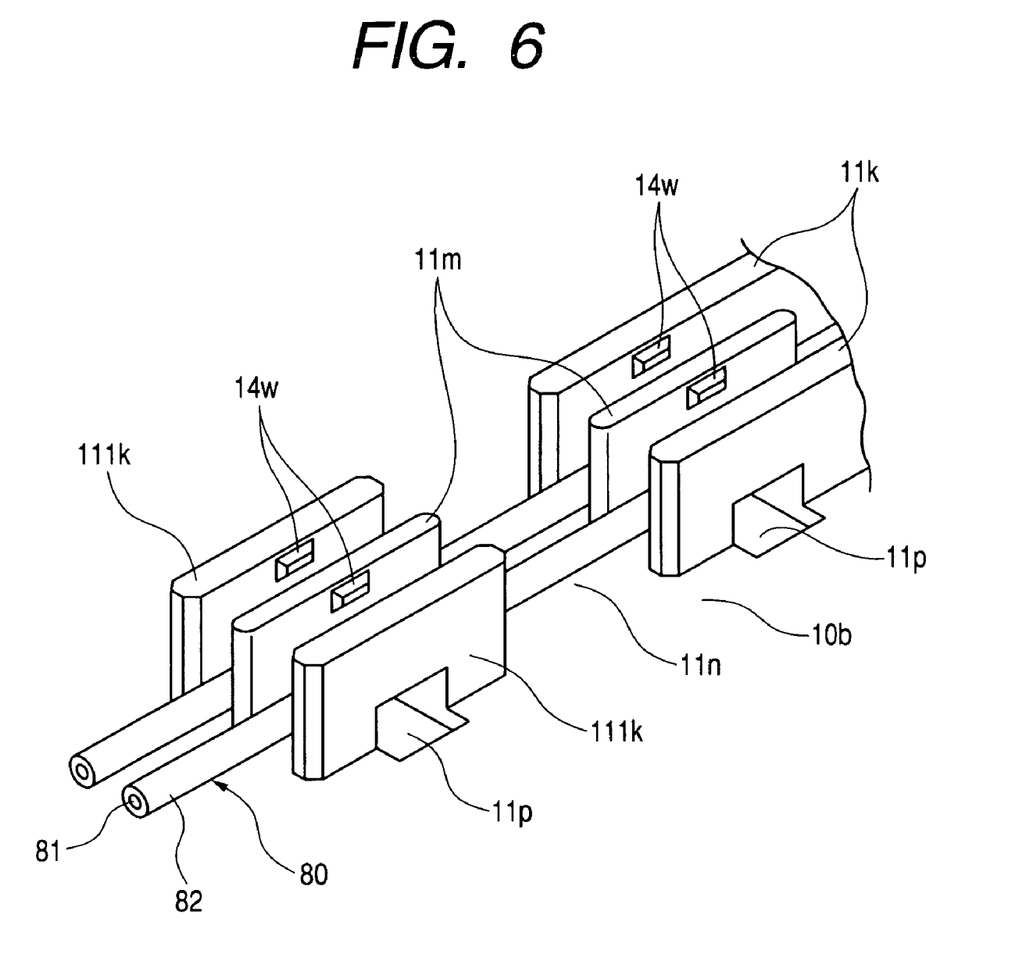
FIG. 6 is an enlarged perspective view of a battery connecting plate according to a third embodiment of the invention.

Instead of the continuous guide walls 11k provided in an encircled area T in FIG. 1, as a third embodiment of the invention, guide walls 111k shown in FIG. 6 may be employed. In this case, the guide walls 111k are partially removed and the guide walls 111k are discretely arranged. With this arrangement, the guide walls 11k and 111k are separately provided by defining spaces 11n therebetween, so that the power lines 80 can be easily laid for the plate body 10. Holes 11p are formed to permit the insertion of a tool for forming the retainers 14w.

As shown in FIG. 6, each of the power lines 80 includes a conductor 81 formed by coiling soft copper lines, and an insulating sheath 82 of vinyl chloride for protecting the conductor 81. Furthermore, as shown in FIG. 1, the twelve collected power lines 80 are folded at a pectinated portion 16. The pectinated portion 16 is formed with projections 16a defining twelve grooves 16b therebetween which are associated with the twelve power lines 80.

A synthetic resin cover holder 40 is attached to the pectinated portion 16 of the plate body 10, and the twelve power lines 80 folded at the pectinated portion 16 are extended along the cover holder 40 and are bundled by a band 90 at a guide portion 19 formed for the plate body 10.

As shown in FIG. 4, crimping is used attach and to electrically connect the power line 80 to a connecting portion 78 of each terminal 70. That is, the power line 80 is caulked by crimping pieces provided with the connecting portion 78 of the terminal 70, so that the electrical connection of the terminal 70 and the power line 80 is ensured. Different colors are designated for the sheath 82 of the power lines 80, so that the individual power lines 80 can be identified at a glance.

A plate cover (not shown) is attached to the battery connecting plate 1 in FIG. 1. Further, a battery cell, consisting of the batteries 400, assembled using the battery connecting plate 1 can be employed as a common battery, or as a fuel cell to be mounted in an electric vehicle.

According to the above described structure, the batteries 400 can be securely assembled using the battery connecting plate 1, while the electric connection of the batteries 400 is easily and surely established by using the bus bars 50. Incidentally, the terminals 60 connected to the electronic elements 210 are fixed to the electrodes 405 of the batteries 400.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A battery connecting plate, comprising:
   a plate body, disposed on a plurality of arrayed batteries;
   a first terminal, provided with a first portion which is connected to one of the batteries, and a second portion which is connected to an electronic element;
   a cover member, attached onto the plate body in a first direction, to provisionally fix the first terminal on the plate body, and
   a conductive bus bar, comprising:
      a third portion, connected to a first one of the batteries;
      a fourth portion, connected to a second one of the batteries; and
      a fulcrum portion, situated between the third portion and the fourth portion, wherein:
      the first terminal is provided with a tolerance compensator, which connects the first portion and the second portion while compensating a positional difference between the second portion and a predetermined position of the second portion in the first direction the plate body is formed with a protrusion which supports the fulcrum portion such that the bus bar is allowed to move in a see-saw manner before the bus bar is fixed on the plate body, and the first portion is held in contact with one of the third portion and the fourth portion after the bus bar is fixed on the plate body.

2. The battery connecting plate as set forth in claim 1, wherein the first terminal comprises a terminal body and a flexible leg portion extended from the terminal body to serve as the tolerance compensator.

3. The battery connecting plate as set forth in claim 2, wherein the terminal body is provided with the first portion, and the flexible leg portion is provided with the second portion.

4. The battery connecting plate as set forth in claim 1, further comprising a second terminal, to which the first terminal is electrically connected via the electronic element.

5. The battery connecting plate as set forth in claim 2, wherein the cover member comprises:

a first cover, which is disposed on the plate body to provide a predetermined position relative to the plate body at which the second portion of the first terminal is placed; and a second cover, which is attached onto the first cover in the first direction to provisionally fix the flexible leg portion between the first cover and the second cover.

6. The battery connecting plate as set forth in claim 1, wherein the plate body is formed with a first stopper, which restricts a movement of the cover member in the first direction.

7. The battery connecting plate as set forth in claim 1, wherein the plate body is formed with a second stopper, which restricts a movement of the cover member in a second direction opposite to the first direction.

8. The battery connecting plate as set forth in claim 4, wherein the first terminal, the second terminal and the electronic element are electrically connected by soldering.

9. The battery connecting plate as set forth in claim 1, further comprising a fixation member, which fixes the first portion of the first terminal to the one of the batteries to thereby plenarily fixing the first terminal on the plate body.

10. The battery connecting plate as set forth in claim 1, wherein the electronic element is an overcurrent protection resister provided in accordance with a maximum output voltage of the one of the batteries.

11. The battery connecting plate as set forth in claim 1, wherein the fulcrum portion of the bus bar and the protrusion of the plate body are configured such that the first portion of the bus bar is separated from the plate body when the second portion of the bus bar is brought into contact with the plate body.

* * * * *